United States Patent
Au et al.

(10) Patent No.: US 8,369,411 B2
(45) Date of Patent: Feb. 5, 2013

(54) INTRA-MACROBLOCK VIDEO PROCESSING

(76) Inventors: James Au, Richmond (CA); Barry Moss, Abbotsford (CA)

(*) Notice: Subject to any disclaimer, the term of this patent is extended or adjusted under 35 U.S.C. 154(b) by 1397 days.

(21) Appl. No.: 11/693,473

(22) Filed: Mar. 29, 2007

(65) Prior Publication Data

US 2008/0240253 A1  Oct. 2, 2008

(51) Int. Cl.
  *H04N 7/12* (2006.01)
(52) U.S. Cl. .................... 375/240.24; 382/234
(58) Field of Classification Search ............ 375/240.24, 375/377, 240.22, 240.25, 240.26, 240.27; 382/232, 236, 238, 234, 244
See application file for complete search history.

(56) References Cited

U.S. PATENT DOCUMENTS

| | | | | |
|---|---|---|---|---|
| 5,142,576 A * | 8/1992 | Nadan | | 380/234 |
| 5,416,529 A * | 5/1995 | Lake | | 348/590 |
| 5,557,332 A | 9/1996 | Koyanagi et al. | | |
| 5,663,724 A * | 9/1997 | Westby | | 341/59 |
| 5,691,768 A | 11/1997 | Civanlar et al. | | |
| 5,847,771 A * | 12/1998 | Cloutier et al. | | 348/564 |
| 5,875,305 A | 2/1999 | Winter et al. | | |
| 6,285,408 B1 * | 9/2001 | Choi et al. | | 348/555 |
| 6,369,855 B1 | 4/2002 | Chauvel et al. | | |
| 6,628,702 B1 * | 9/2003 | Rowitch et al. | | 375/150 |
| 6,887,590 B2 * | 5/2005 | Zeizinger et al. | | 428/659 |
| 7,409,056 B2 * | 8/2008 | LeBlanc et al. | | 379/399.01 |
| 7,436,903 B2 * | 10/2008 | Sandhu et al. | | 375/315 |
| 7,843,998 B2 | 11/2010 | Bjontegaard | | |
| 7,953,284 B2 | 5/2011 | Au et al. | | |
| 2002/0015092 A1 * | 2/2002 | Feder et al. | | 348/14.13 |
| 2002/0021234 A1 | 2/2002 | Yanagiya et al. | | |
| 2002/0196853 A1 | 12/2002 | Liang et al. | | |
| 2003/0138045 A1 | 7/2003 | Murdock et al. | | |
| 2005/0094729 A1 | 5/2005 | Yuan et al. | | |
| 2005/0196051 A1 * | 9/2005 | Wong et al. | | 382/232 |
| 2006/0088099 A1 | 4/2006 | Gao et al. | | |

(Continued)

FOREIGN PATENT DOCUMENTS

| EP | 1 296 520 | 3/2003 |
|---|---|---|
| EP | 1 355 499 A2 | 10/2003 |

(Continued)

OTHER PUBLICATIONS

Genhua Jin et al , A parallel and pipelined exexuation of H.264/AVC intra prediction, 2006, IEEE comptuer society, p. 1-6.*

(Continued)

*Primary Examiner* — Eleni Shiferaw
*Assistant Examiner* — Abu Sholeman
(74) *Attorney, Agent, or Firm* — Merchant & Gould

(57) ABSTRACT

A system for processing sub-blocks of a macroblock of a video frame. In an example embodiment, the system includes a first module that is adapted to process each sub-block of the macroblock, wherein each sub-block is associated with a predetermined position in a first sequence. The processing of certain sub-blocks in the first sequence requires results of processing of one or more previously processed sub-blocks in the first sequence. A controller selectively enables the first module to process each sub-block of a second sequence that is altered from the first sequence so that the first module implements parallel or pipelined processing of certain sub-blocks of the macroblock. In a more specific embodiment each sub-block in the first sequence of sub-blocks is consecutively numbered 0-15 according to H.264 standards.

20 Claims, 12 Drawing Sheets

U.S. PATENT DOCUMENTS

| | | | |
|---|---|---|---|
| 2006/0126726 | A1 | 6/2006 | Lin et al. |
| 2006/0294174 | A1 | 12/2006 | Haque et al. |
| 2008/0056350 | A1* | 3/2008 | Lyashevsky et al. ...... 375/240.1 |
| 2008/0075376 | A1 | 3/2008 | Wilson et al. |
| 2008/0117965 | A1 | 5/2008 | Vysotsky et al. |
| 2008/0162911 | A1 | 7/2008 | Vaithianathan |
| 2008/0240228 | A1* | 10/2008 | Heinrich et al. ......... 375/240.01 |
| 2008/0240233 | A1* | 10/2008 | Au et al. .................. 375/240.02 |
| 2008/0240253 | A1* | 10/2008 | Au et al. .................. 375/240.24 |
| 2008/0240254 | A1 | 10/2008 | Au et al. |
| 2008/0240587 | A1 | 10/2008 | Au et al. |
| 2008/0291940 | A1 | 11/2008 | LeBlanc et al. |

FOREIGN PATENT DOCUMENTS

| | | |
|---|---|---|
| WO | WO 01/52538 | 7/2001 |
| WO | WO2008/039321 | 4/2008 |
| WO | WO 2008/039321 | 4/2008 |
| WO | WO 2008/121662 A2 | 10/2008 |
| WO | WO 2008/121663 A2 | 10/2008 |
| WO | WO 2008/121664 A2 | 10/2008 |
| WO | WO 2008/121664 A3 | 10/2008 |
| WO | WO 2008/121667 A2 | 10/2008 |
| WO | WO 2008/121667 A3 | 10/2008 |
| WO | WO 2008/127855 A1 | 10/2008 |

OTHER PUBLICATIONS

Wonjae Lee et al, Piplelined intra prediction using shuffled encoding order for H 264/AVC, 2006 IEEE and p. 4.*

European Office Action dated Dec. 17, 2010 cited in Application No. 08 732 886.0.

Genhua Jin, et al., "A Parallel and Pipelined Execution of H.264/AVC Intra Prediction", 6 pages, Computer and Information Technology, 2006.

Wonjae Lee, et al., "Pipelined Intra Prediction Using Shuffled Encoding Order for H.264/AVC", 4 pages, Tencon 2006, 2006 IEEE Region Conference.

Sato K., et al., "Consideration on Intra Prediction for Pipeline Processing in H.264/MPEG-4 AVC", 10 pages, Applications of Digital Image Processing XXVII, Proceedings of SPIE, vol. 5558, 2004.

Yu-Wen Huang, et al., "Hardware Architecture Design for H.264/AVC Intra Frame Coder", 4 pages, Circuits and Systems, 2004.

Mo Li et al., "A High Throughput Binary Arithmetic Coding Engine for H.264/AVC," Solid-State and Integrated Circuit Technology, 2006, 5 pgs.

Hassan Shojania et al., "A VLSI Architecture for High Performance CABAC Encoding," Visual Encoding and Image Processing, 2005, Proc. of SPIE vol. 5960, 11 pgs.

Hassan Shojania et al., "A High Performance CABAC Encoder," IEEE-NEWCAS Conference, 2005, 4 pgs.

Hendrik Eeckhaut et al., "Optimizing the critical loop in the H.264/AVC CABAC Decoder," Field Programmable Technology, 2006, pp. 113-118.

Lingfeng Li et al., "A CABAC Encoding Core with Dynamic Pipeline for H.264/AVC Mail Profile," Circuits and Systems, 2006, pp. 760-763.

Detlev Marpe et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 621-636.

Ron Wilson, "The Right Video Architecture Can Make All the Difference," Acquired at: http://www.edn.com/contents/images/6363920.pdf, Sep. 1, 2006, 9 pgs.

Jian-Wen Chen et al., "Introduction to H.264 Advanced Video Coding," Design Automation, Asia and South Pacific Conference on Jan. 24, 2006, pp. 736-741.

International Search Report dated Dec. 3, 2008 cited in Application No. PCT/US2008/058349.

International Search Report dated Nov. 10, 2008 cited in Application No. PCT/US2008/058335.

International Search Report dated Nov. 14, 2008 cited in Application No. PCT/US2008/058334.

International Preliminary Report dated Sep. 29, 2009 cited in Application No. PCT/US2008/058334.

European Office Action dated Feb. 11, 2010 cited in Application No. 08 732 886.0.

European Office Action dated Feb. 25, 2010 cited in Application No. 08 780 490.2.

European Office Action dated Mar. 18, 2010 cited in Application No. 08 744 419.6.

European Office Action dated Mar. 18, 2010 cited in Application No. 08 732 889.4.

U.S. Office Action dated Jul. 23, 2010 cited in U.S. Appl. No. 11/693,439.

U.S. Final Office Action dated Oct. 18, 2010 cited in U.S. Appl. No. 11/693,439.

U.S. Office Action dated Jun. 16, 2011 cited in U.S. Appl. No. 11/693,567.

U.S. Office Action dated Jun. 16, 2011 cited in U.S. Appl. No. 11/693,526.

U.S. Office Action dated Jun. 27, 2011 cited in U.S. Appl. No. 11/693,506.

Canadian Office Action dated Jul. 4, 2011 cited in Application No. 2,682,590.

European Office Action dated Nov. 3, 2011 cited in Application No. 08 732 886.0, 6 pgs.

Canadian Office Action dated Jan. 5, 2012 cited in Application No. 2,682,461, 3 pgs.

Canadian Office Action dated Jan. 11, 2012 cited in Application No. 2,682,449, 3 pgs.

U.S. Final Office Action dated Dec. 16, 2011 cited in U.S. Appl. No. 11/693,526, 21 pgs.

U.S. Final Office Action dated Dec. 29, 2011 cited in U.S. Appl. No. 11/693,567, 19 pgs.

U.S. Final Office Action dated Jan. 4, 2012 cited in U.S. Appl. No. 11/693,506, 19 pgs.

European Office Action dated May 29, 2012 cited in Application No. 08 732 886.0, 7 pgs.

Canadian Office Action dated Jun. 4, 2012 cited in Application No. 2,682,590, 2 pgs.

Canadian Office Action dated Jun. 21, 2012 cited in Application No. 2,682,461, 4 pgs.

Canadian Office Action dated Mar. 26, 2012 cited in Application No. 2,682,436, 2 pgs.

Canadian Office Action dated May 7, 2012 cited in Application No. 2,682,315, 3 pgs.

\* cited by examiner

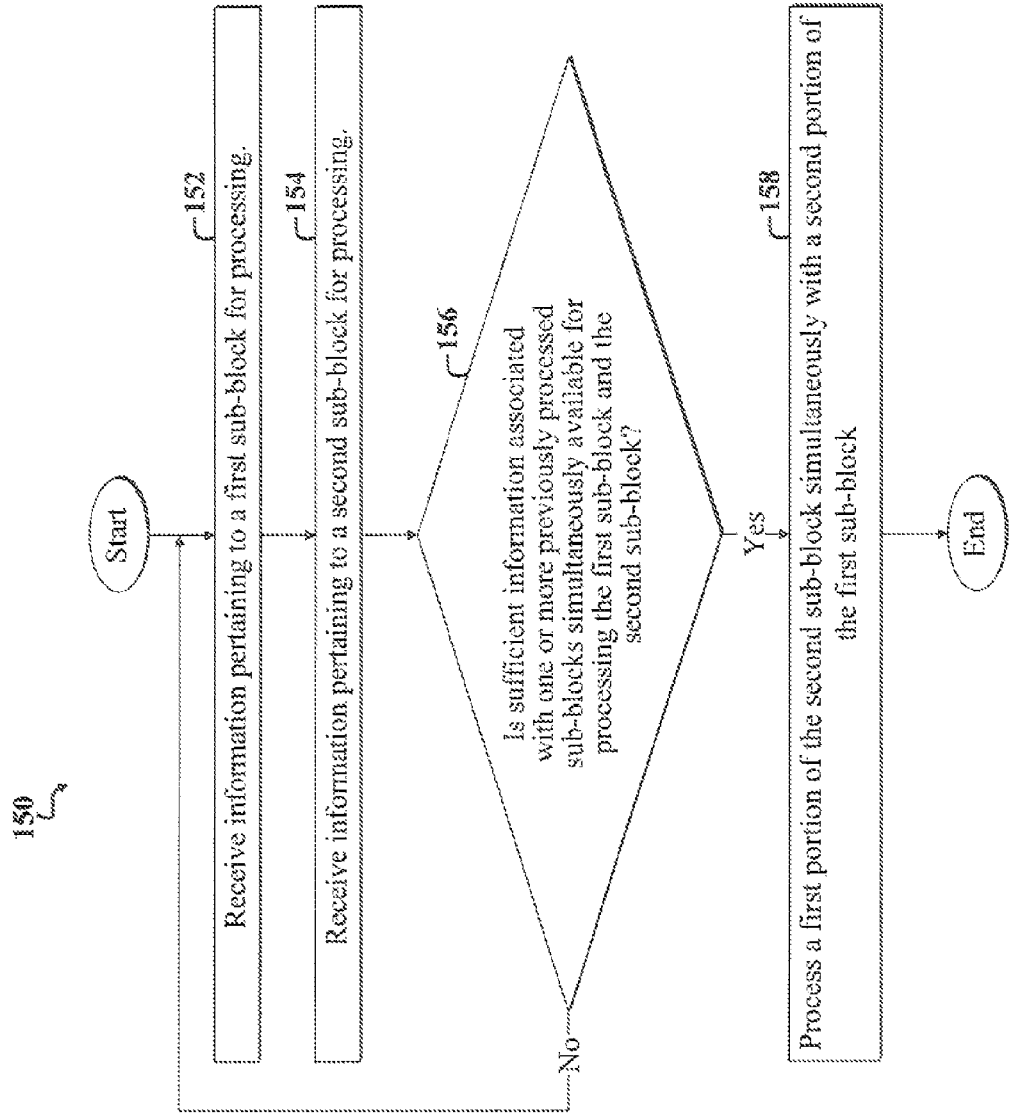

INTRA-MACROBLOCK VIDEO PROCESSING

BACKGROUND OF THE INVENTION

This disclosure relates generally to image or video processing and more specifically relates to processing pixels and associated sub-blocks within a macroblock of an image or video frame. Video processing systems are employed in various demanding applications, including high-definition television, missile guidance systems, and Internet video streaming. Such applications often demand compact cost-effective systems for encoding, transmitting, and decoding high quality compressed video relatively accurately, quickly, and efficiently.

Standards such as H.264 define specific ways of doing video encoding and decoding. H.264 is a digital video codec standard written by the Joint Video Team (JVT) comprising the International Telecommunication Union (ITU)—Telecommunication Standardization Sector (T) and the International Organization for Standardization (ISO)/International Electrotechnical Commission (IEC) Moving Picture Experts Group (MPEG). The H.264 standard is also called, the ISO/IEC MPEG-4 Part 10 standard or the ITU-T H.264 standard.

In an example H.264 system, pixels of a video image are logically grouped into 16×16 blocks of pixels called macroblocks. Each macroblock is grouped into sixteen 4×4 blocks of pixels, called sub-blocks. The image is partitioned into groups of contiguous macroblocks in coding order, called slices, each containing several macroblocks. When this example H.264 system processes a slice, information from one or more previously processed macroblocks is typically required before a subsequent macroblock is processed. Similarly, when processing sub-blocks within a macroblock, information from one or more previously processed sub-blocks is typically required before a subsequent sub-block is processed. Improvements in the speed and efficiency of implementing H.264 functions such as processing macroblocks, sub-blocks, or other data can lead to a better performing, lower cost, or otherwise more desirable system or product.

BRIEF DESCRIPTION OF THE DRAWINGS

FIG. 10 is a flow diagram of an example method suitable for use with the intra macroblock processors of FIGS. 3b and 4 and accompanying inter/intra processing module FIGS. 1-2.

DETAILED DESCRIPTION OF EXAMPLE EMBODIMENTS

Figure 1:
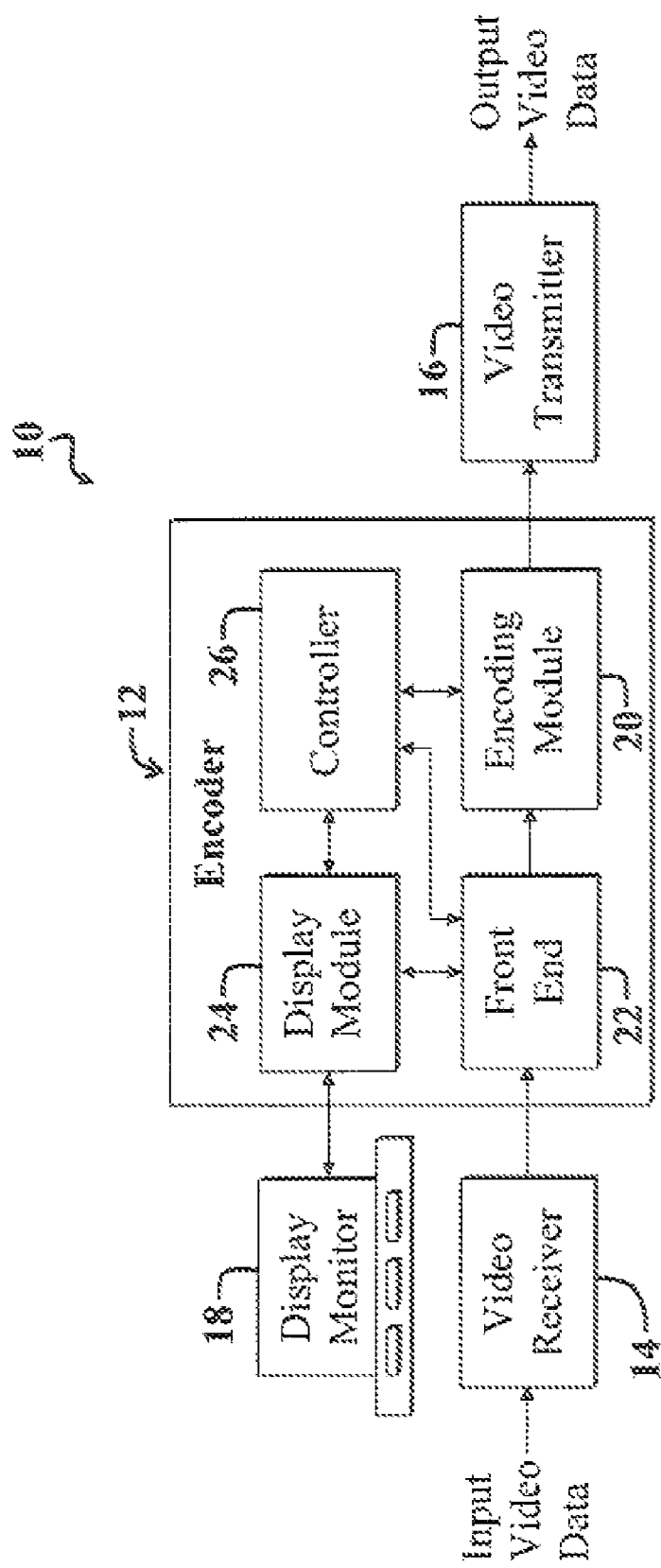
FIG. 1 illustrates an example video-encoding system.

A particular embodiment of the invention is discussed with respect to an implementation of an H.264 system. However, it should be apparent that aspects of the invention may be used to implement different standards or may be used in association in any other suitable data processing application. Nothing in the H.264 specifications should be construed as limiting the scope of the invention unless so noted. Many of the same terms that appear in the H.264 specification are used in the present specification but these terms are intended to have different meanings. For example, a macroblock may be any grouping of pixels in a frame of data. A sub-block may be any grouping of pixels within a macroblock. A frame may be any set of data that includes plural pixels of information, where a pixel may be a value associated with a data point. A video frame or an image frame may be any collection of data points or pixels that are associated with an image or something to be displayed or viewed. The terms video frame and image frame are employed interchangeably herein. An image may be any thing or representation of a thing that can be viewed. A slice of an image frame may be any grouping of macroblocks for processing purposes.

An example of a macroblock is the macroblock discussed in the H.264 Main Profile (MP) and High Profile (HiP) standards, which includes a 16×16 group of pixels. An example of a sub-block is a 4×4 grouping of pixels. An example of documentation that provides details of the H.264 standard is ISO/IEC 14496-10 (ITU-T H.264), International Standard (2005), Advanced video coding for generic audiovisual services; which is hereby incorporated by reference as if set forth in fell in this specification for all purposes. For the purposes of generating a prediction frame, macroblocks within a slice are predicted based on previously predicted macroblocks so that values associated with one macroblock within the slice depend on values associated with one or more other macroblocks within the slice. The arrangement and size of a group of data can vary, as desired. For example, in other applications the groups can be of any dimensions and need not necessarily be square or even rectangular groupings.

An example embodiment of a system for processing sub-blocks of a macroblock includes a first module that is adapted to process each sub-block of the macroblock. Each sub-block is associated with a predetermined position in a first sequence. The processing of certain sub-blocks in the first sequence requires results of processing of one or more previously processed sub-blocks in the first sequence. A controller selectively enables the first module to process each sub-block of a second sequence that is altered from the first sequence so that the first module implements parallel processing of certain sub-blocks of the macroblock.

Use of this embodiment to facilitate parallel processing of sub-blocks of a macroblock may improve processing speeds, enabling video frames to be processed in a single slice, which may greatly increase video quality. This is unlike certain conventional video processing systems that must partition each video frame into multiple slices due to use of relatively inefficient methods, serial processing, and hardware speed and performance limitations.

In an H.264-compliant embodiment, each sub-block in the first sequence of sub-blocks is consecutively numbered 0-15 according to H.264 standards. The controller facilitates feeding sub-blocks numbered 0, 1, 2, 3, 8, 9, 10, 11, in order, or sub-blocks numbered 0, 1, 4, 5, 8, 9, 12, 13, in order, to the first module. Furthermore, the controller feeds the sub-blocks 4, 5, 6, 7, 12, 13, 14, 15, in order, or sub-blocks 2, 3, 6, 7, 10, 11, 14, 15, in order, to the first module. Note that such sequence orders are merely illustrative and that other arrangements are possible.

The first module includes a first mechanism for processing sub-blocks of certain pairs of sub-blocks in a pipelined fashion. The certain pairs of sub-blocks include sub-blocks numbered 2 and 4; 3 and 5; 8 and 6; 9 and 7; 10 and 12; and 11 and 13. The first module includes a second mechanism for processing sub-blocks of certain pairs of sub-blocks in parallel. Note that the order of individual sub-blocks within each pair of sub-blocks indicated above may be changed without departing from the scope of the present teachings. Parallelism in processing can be achieved by any manner known in the art such as by using multiple processors, pipelined stages, etc.

In an illustrative embodiment, the second mechanism includes a first engine and a second engine. The second engine is fed sub-blocks for processing in the following order after sub-block numbered 1 is processed by the first engine: 4, 5, 6, 7, 12, 13, 14, 15. Alternatively, second engine is fed sub-blocks in the following order after sub-block numbered 1 is processed by the first engine: 2, 3, 6, 7, 10, 11, 14, 15. In this example embodiment, the controller includes a demultiplexer that is adapted to feed requisite processing information pertaining to one or more sub-blocks to the first module in a desired sequence or in parallel in response to a predetermined control signal.

For the purposes of the present discussion, a sub-block is said to be fed to a processor if information pertaining to the sub-block is delivered to the processor to enable processing of the sub-block by the processor.

Processes implemented via the parallel engines may include implementing intra prediction for a sub-block. For the purposes of the present discussion, intra prediction may be any process wherein one or more pixels in an image frame are predicted or estimated based on information associated with the image frame. Intra prediction may include the process wherein values for a predicted sub-block are predicted or ascertained from one or more other sub-blocks within a macroblock of a frame that includes or is to include the macroblock.

Hence, unlike a conventional system that must process sub-blocks of a macroblock serially via a single engine, certain embodiments discussed herein enable use of multiple engines to process sub-blocks of a macroblock within an image frame. This may result in improved encoder performance, image quality, and so on.

For clarity, various well-known components, such as power supplies, H.264 decoders, computer systems, daughter cards, audio encoders, hosts, user interfaces, scaling circuits (Q-1), timing clocks, and so on, have been omitted from the figures. However, those skilled in the art with access to the present teachings will know which components to implement and how to implement them to meet the needs of a given application.

FIG. 1 illustrates an example video-encoding system 10. The encoding system 10 includes an encoder 12, which receives video input from a video receiver 14 and provides resulting compressed video to a video transmitter 16. For illustrative purposes, the encoder 12 is shown communicating with a display 18 for displaying video frames.

The encoder 12 includes an encoding module 20, a front end 22, a display module 24, and a controller 26. The front end 22 communicates with the video receiver 14, the encoding module, the display module 24, and the controller 26. The encoding module 20 further communicates with the controller 26. The display module 24 further communicates with the controller 26 and the display monitor 18.

In operation, the front end 22 and formats input from the video receiver 14, which is accessible by the display module 24 and the encoding module 20. The controller 26 provides control input to the display module, the front end 22, and the encoding module 20 to facilitate controlling the operation of the encoder. Input video may be displayed via the display monitor 18 after the video data is formatted and prepared as needed via the display module 24.

In the present example embodiment, the encoding module 20 compresses input video in accordance with one or more H.264 standards and via a pipelined or parallel processing scheme, as discussed more fully below. Example processing functions implemented via the encoding module 20 include inter prediction, intra prediction, frequency transforms, quantization, dequantization, frame subtraction and addition, and entropy coding for video image frames. The encoding module 20 outputs resulting compressed video to the video transmitter 16. The video transmitter 16 may then transmit the resulting video to a decoder, to memory, and so on, as needed for a particular application.

The encoding module 20 may be implemented to perform processing which is in accordance with H.264 standards. The front end 22, display module 24, and controller 26 may be implemented via various technologies, including, but not limited to Field Programmable Gate Array (FPGA) and Digital Signal Processor (DSP) technologies.

Figure 2A:
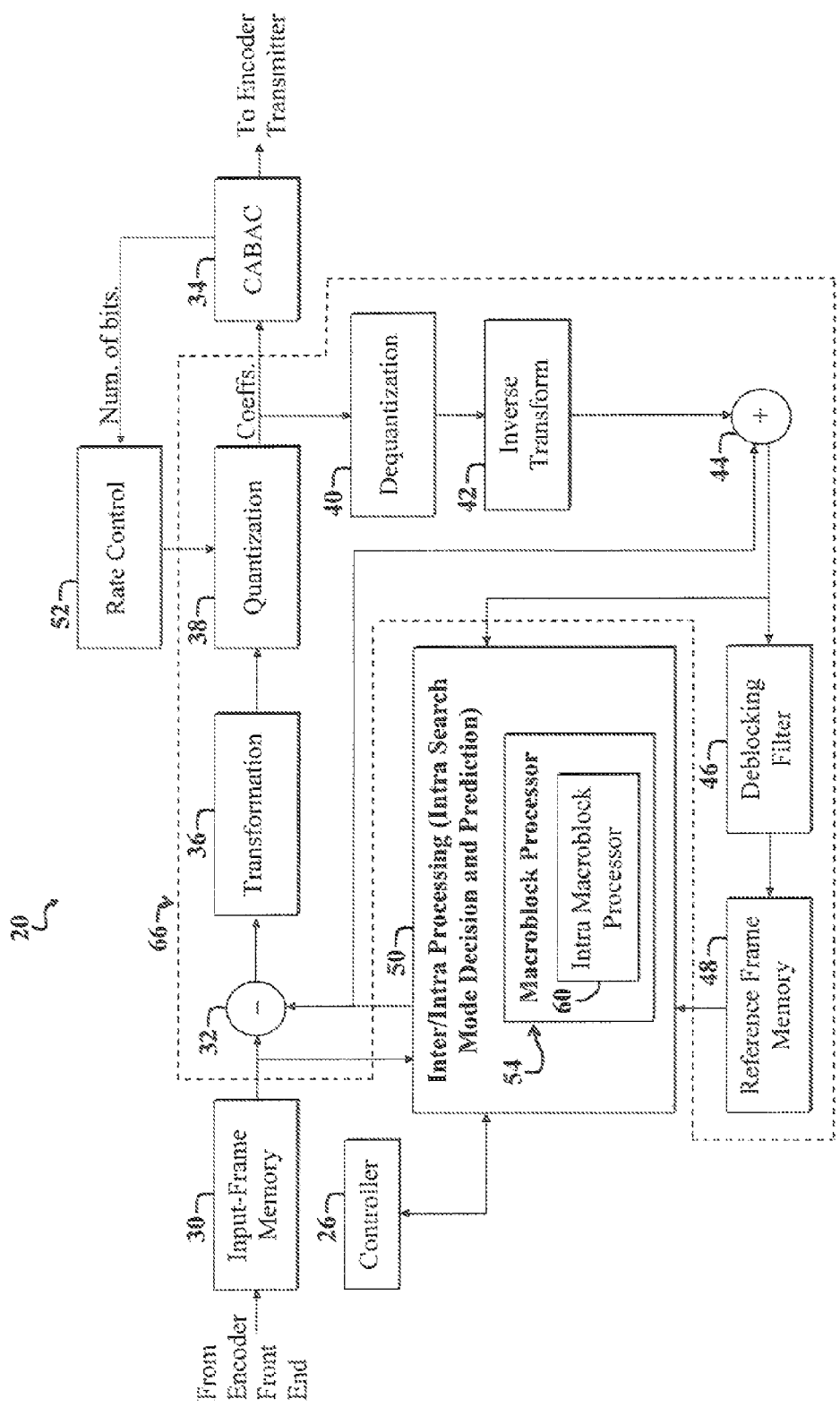
FIG. 2a is a more detailed diagram illustrating example components of a first embodiment of an encoding module usable with the video-encoding system of FIG. 1.

FIG. 2a is a more detailed diagram illustrating example components 30-52 of the encoding module 20 included in the video-encoding system 10 of FIG. 1. The encoding module 20 includes an input-frame memory 30 for receiving and selectively storing video frames from the front end 22 of FIG. 1. The output of the input-frame memory 30 is input to a subtracter 32 and to an inter/intra processing module 50. The subtracter 32 also receives input from the inter/intra processing module 50 and provides output to a transformation module 36. An output of the transformation module 36 is coupled to a quantization module 38, also called a quantizer, an output of which is coupled to inputs of a dequantization module 40 and a entropy encoder 34. In the present example embodiment, the entropy encoder 34 implements Context Adaptive Binary Arithmetic Coding (CABAC), and consequently, is also called a CABAC module. The CABAC module 34 provides feedback to a rate control module 52, which provides a rate-control signal to the quantizer 38.

The dequantizer 40 is further coupled to an inverse transform module 42, an output of which is coupled to an input of an adder 44. An output of the adder 44 is coupled to an input of a deblocking filter 46. An output of the deblocking filter 46 is coupled to as input of a reference frame memory 48. An output of the reference frame memory 48 is coupled to an input of the inter/intra processing module 50. An output of the inter/intra processing module 50 is coupled to an input of the subtracter 32 and to an input of the adder 44. The inter/intra processing module 50 further includes a macroblock processor 54 for processing macroblocks within a slice of a video image frame, and an intra macroblock processor 60 for processing sub-blocks of macroblocks processed by the macroblock processor 54. The intra macroblock processor 60 may act as a nested processing loop within a loop governed by the macroblock processor 54 as discussed more fully below.

In operation, an input frame from the input-frame memory 30 is provided to the inter/intra processing module 50 and to the subtracter 32. The frame is processed by the encoding module 20 in units of macroblocks. Each macroblock is encoded so-called inter mode or intra mode. In inter mode, the inter/intra processing module 50 executes one or more instructions to facilitate forming a prediction frame based on a previously reconstructed and filtered frame, called a reference frame, which is provided to the inter/intra processing module 50 by the reference frame memory 48. The inter/intra processing module 50 may also implement inter/intra search and mode-decision functions. Details of inter/intra search and mode-decision operations that are known in the art may be readily adapted for use with example embodiments by those skilled in the art, without undue experimentation.

Reference frames used for inter prediction have been filtered by the deblocking filter 46. The inter/intra processing module 50 employs a first feedback loop formed by the inter/intra processing module 50, the subtracter 32, the transformation module 36, the quantization module 38, the dequantizer 40, the inverse transform module 42, the adder 44, the deblocking filter 46, and the reference frame memory 48 to facilitate generating a motion-compensated predicted frame from one or more reference frames.

In intra mode, the inter/intra processing module 50 executes one or more instructions to facilitate forming a prediction frame based on the current frame, as opposed to a reference frame. In intra mode, the inter/intra processing module 50 employs a second feedback loop that includes the inter/intra processing module 50, the subtracter 32, the transformation module 36, the quantizer 38, the dequantizer 40, the inverse transform 42, and the adder 44 to facilitate computing a reconstructed prediction frame. For the purposes of the present discussion, the second feedback loop 32, 36, 38, 40, 42, 44 and the first feedback loop 32, 36, 38, 40, 42, 44, 46, 48, are called the macroblock TQR (Transform, Quantization, Reconstruction) loop 66.

In either mode, a predicted macroblock output by the inter/intra processing module 50 is subtracted from the corresponding macroblock in the input frame that is output from the input-frame memory 30. The resulting macroblock is called a residual or difference macroblock. The difference macroblock is then transformed from a time domain to a frequency domain, such as via a block transform, by the transformation module 36. The resulting transformed macroblock is quantized by the quantizer 38; dequantized by the dequantizer 40; and then transformed back to the time domain via the inverse transform module 42. The resulting residual macroblock is added to a corresponding macroblock from the prediction frame that is output from the inter/intra processing module 50 before the resulting added macroblock, called a reconstructed macroblock, is input back to the inter/intra processing module 50 as a reconstructed macroblock.

The output of the quantizer 38 represents a set of quantized transform coefficients, also called residuals. These coefficients are then entropy encoded via the CABAC 34. Entropy encoded coefficients and information required to decode a macroblock, such as prediction mode, quantizer step size, and so on, are output from the CABAC 34 via one or more bitstreams. The number of bits employed by the CABAC during a given operation may be fed back to the rate control module 52 to facilitate controlling the amount of information removed by the quantizer, thereby controlling the final bit rate.

Hence, the rate control module 52 generates rate control signals to control the quantizer 38 and accompanying quantization parameters based on bit-production feedback from a previous frame, picture complexity, current bit buffer levels. The inter/intra processing module 50 may facilitate performing prediction through intra search mode-decision operations; may implement a mode decision function that selects a best prediction mode for each macroblock to be processed; and may perform prediction via intra compensation to form sample intensity predictions. The terms intra compensation and intra prediction may be employed interchangeably herein. Intra compensation involves predicting a macroblock based on information from the current frame in which the macroblock is a part.

The subtracter 32 outputs residuals representing differences between input data samples from the input-frame memory 30 and prediction samples from the inter/intra processing module 50. The transform module 36 converts residuals to the frequency domain. The quantizer 38 quantizes frequency coefficients, effectively discarding certain information to reduce entropy in the residuals. The dequantizer 40 and inverse transform module 42 are adapted to reconstruct transformed and quantized residuals through dequantization and inverse transform processes. The adder 44 facilitates adding reconstructed residuals output from the inverse transform module 42 to prediction samples output from the inter/intra processing module 50 to reconstruct decoded samples for a given macroblock. The deblocking filter 46 is adapted to remove blocking artifacts from decoded samples output from the adder 44. The CABAC 34 is adapted to implement entropy coding in accordance with H.264 main/high profile. The CABAC 34 codes macroblock modes, prediction information, and residuals into H.264-compliant bitstreams.

For illustrative purposes, the controller 26 is shown communicating with the inter/intra processing module 50. The controller 26 may communicate with more modules, different modules, or no modules in FIG. 2 without departing from the scope of the present teachings. Furthermore, the rate-control module 52 and the controller 26 may be implemented in a common control module without departing from the scope of the present teachings.

Example embodiments discussed more fully below pertain primarily to intra prediction mode and corresponding components within the inter/intra processing module 50 for implementing intra prediction mode. Intra prediction mode may involve performing intra prediction. However, those skilled in the art with access to the present teachings may readily adapt the embodiments to accommodate inter prediction mode without undue experimentation and without departing from the scope of the present teachings.

For illustrative purposes, the implementation of FIG. 2a shows a single Transform Quantization Reconstruction (TQR) loop 66 outside of the inter/intra processing module 50. However, in practice, a hardware implementation may incorporate one or more separate TQR loops within the intra macroblock processor 60, as discussed more fully below.

Figure 2B:
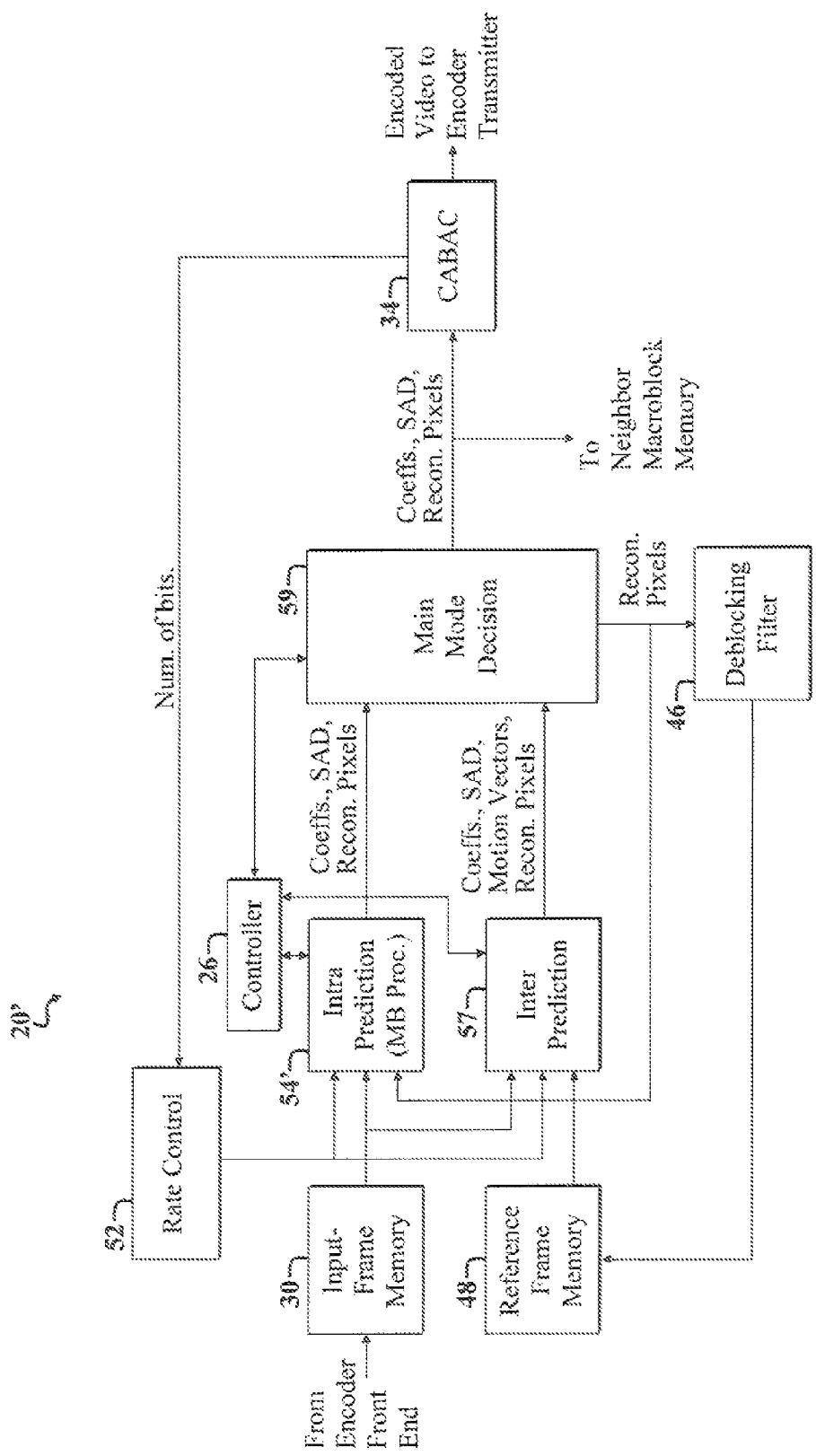
FIG. 2b is more detailed diagram illustrating example components of a second embodiment of an encoding module usable with the video-encoding system of FIG. 1.

FIG. 2b is more detailed diagram illustrating example components of a second embodiment of an encoding module 20' that is usable with the video-encoding system 10 of FIG. 1. The encoding module 20' of FIG. 2b may be substituted for the encoding module 20 of FIGS. 1 and 2a.

The alternative encoding module 20' includes the input-frame memory 30, which may receive input video data from the encoder front end 22 of FIG. 1 and provide input video data to an intra prediction module 54' and to an inter prediction module 57. The reference frame memory 48 receives filtered reconstructed pixel data from the deblocking filter 46. The filtered reconstructed pixel data represents reference video data corresponding to reference frames. The reference frames are provided to the inter prediction module 57 for use in inter prediction calculations.

In the present example embodiment, output from the intra prediction module 54' includes residual coefficients, reconstructed pixels, and Sum of Absolute Difference (SAD) values, which are input to a main decision mode module 59. The SAD values represent a measure of the quality, efficiency, or accuracy of the intra prediction performed by the intra prediction module 54'. Note that while the present embodiment employs SAD values, other figures of merit may be employed in addition to or instead of SAD values to facilitate selecting a desirable or efficient prediction mode, without departing from the scope of the present teachings. The accuracy of the intra prediction is a measure of how closely video data compressed by the intra prediction module 54' matches corresponding video data from the input frame memory 30.

In the present embodiment, the intra prediction module 54' corresponds to the macroblock processor 54 of FIG. 2a. Intra prediction uses information from reconstructed neighboring macroblocks in the same frame to predict the current macroblock. By sending the prediction mode and the transformed and quantized version of the differences (coefficients) between the predicted macroblock and the original macroblock to the mode decision module 59, the information required to reconstruct the macroblock, such as at a decoder, is reduced or compressed.

Similarly, the inter prediction module 57 outputs coefficients, SAD values, motion vectors, and reconstructed pixels to the main mode decision module 59. Inter prediction uses information from a previous frame to predict values for the current macroblock. One inter prediction technique, which may be implemented via the inter prediction module 57, involves searching for a group of pixels in the previous frame that looks similar to a group of pixels in the present frame and then transmitting, to the main mode decision module 59, a motion vector along with the transformed and quantized version of the differences between the predicted macroblock and the original macroblock from the input frame memory 30. Note that the inter prediction module 57 employs reference frames that have been filtered by the deblocking filter 46 and employs original input frames from the input frame memory 30 to facilitate performing inter prediction. Inter prediction may be more efficient or otherwise more preferred than intra prediction in certain situations and vice versa.

The main mode decision module 59 includes instructions for selecting a preferred prediction method based on output from the intra prediction module 54' and the inter prediction module 57. For example, in certain situations, such as when a video changes scenes or otherwise changes suddenly, output from the intra prediction module 54' may be chosen as the output of the main mode decision module. In other situations, such as when successive frames of a video are very similar, output from the inter prediction module 57 may be chosen as the output of the main mode decision module 59. Generally, intra prediction is often performed when encoding so-called I-frames, which are defined in accordance with H.264 standards. Inter prediction is often performed when encoding P-frames, which are also defined in accordance with H.264 standards. When encoding P-frames. It is possible to encode a frame using a combination of inter prediction mid intra prediction. Exact details of methods implemented by the main mode decision module 59 are application specific. Those skilled in the art with access to the present teachings may readily implement appropriate methods to meet the needs of a given application, without undue experimentation.

The intra prediction module 54' and the inter prediction module 57 include TQR loops as discussed more fully below. The TQR loops facilitate reconstructing pixels and providing residual coefficients to the main mode decision module 59.

The operation of the rate control module 52 in FIG. 2b is similar to the operation of the rate control module 52 in FIG. 2a in that the rate control modules 52 of FIGS. 2a and 2b employ feedback from the CABAC module 34 to facilitate controlling the rate at which intra prediction and/or inter prediction are performed.

For illustrative purposes, the controller 26 is shown communicating with the intra prediction module 54' and the inter prediction module 57. Note, however, that the controller 26 may be implemented separately from the controller 26 of FIG. 1 without departing from the scope of the present teachings. Furthermore, while only one controller 26 is shown, multiple controllers may be employed.

In the present specific embodiment, the intra prediction module 54' is adapted to perform parallel processing of sub-blocks of a macroblock. The intra prediction module 54' employs a neighbor pixel selector that strategically controls the flow of sub-block information during intra prediction operations, thereby facilitating parallel processing; obviating the need to store the sub-block information in a large memory; and further obviating the need to use a relatively bulky inefficient multiplexer to read from the large memory, as discussed more fully below.

Figure 3A:
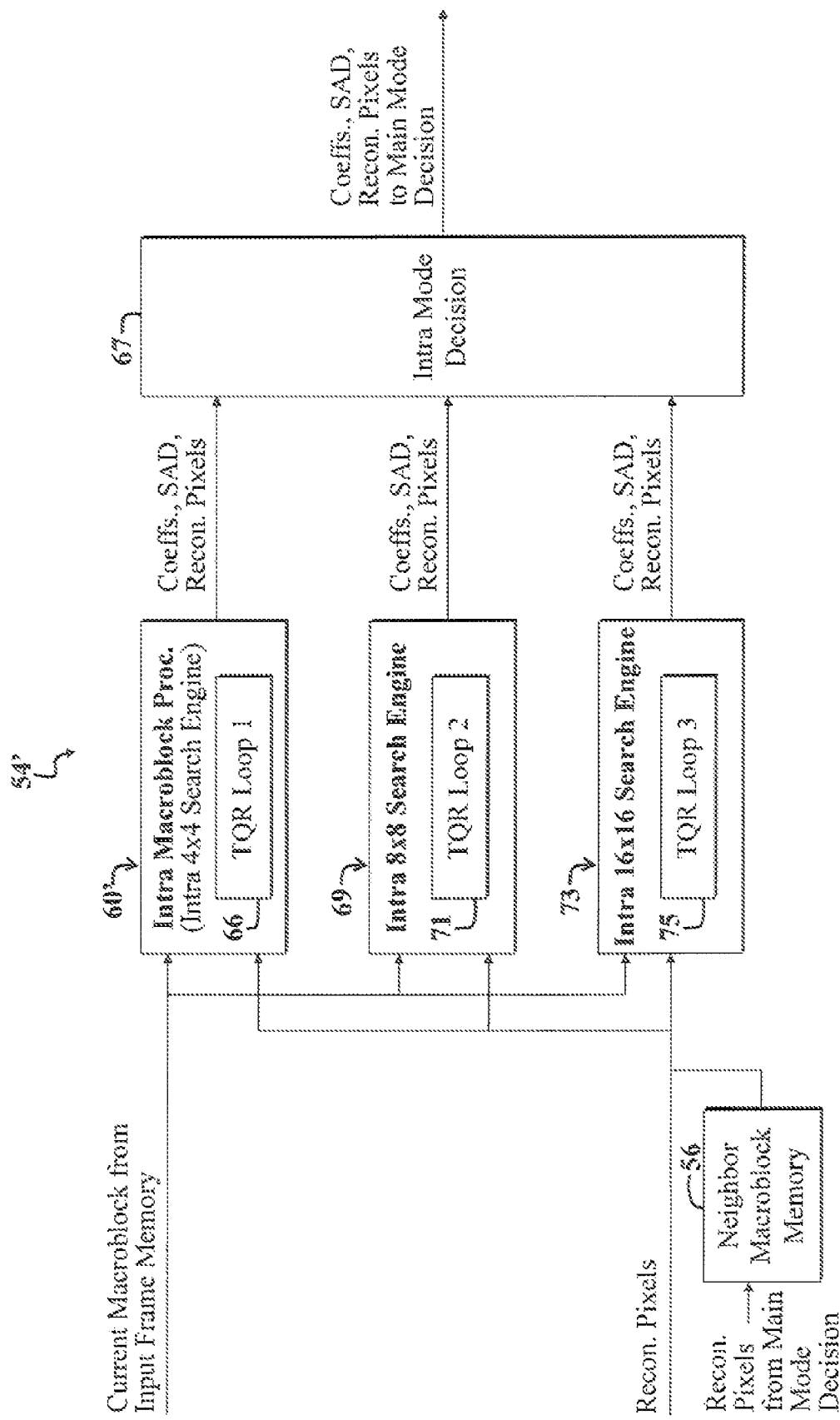
FIG. 3a is a more detailed diagram illustrating example components of the intra prediction module of the encoding module of FIG. 2b.

FIG. 3a is a more detailed diagram illustrating example components of the intra prediction module 54' of the encoding module 20' of FIG. 2b. The intra prediction module 54' includes an intra 4×4 search engine 60', also called an intra macroblock processor. For illustrative purposes, the intra macroblock processor 60' of FIG. 3a is similar to the intra macroblock processor 60 of FIG. 2a, with the exception that the macroblock processor 60' of FIG. 3a includes the TQR loop 66. However, a substantially different macroblock processor may be employed in FIG. 3a with out departing from the scope of the present teachings.

The intra prediction, module 54' further includes an optional intra 8×8 search engine 69, and an intra 16×16 search engine 69. The search engines 60', 69, 73 include individual TQR loops 66, 71, 75. The search engines 60', 69, 73 receive input macroblock data from an input frame memory, such as the memory 30 of FIG. 2b, and also receive reconstructed pixel information from the output of the main mode decision module 59 of FIG. 2b. The search engines 60', 69, 73 then perform intra 4×4 prediction, intra 8×8 prediction, and 16×16 prediction, respectively, to provide corresponding coefficients, SAD values, and reconstructed pixels to an intra mode decision module 67. The intra mode decision module 67, then performs implements instructions for selecting a preferred intra search method. In the present specific embodiment, intra mode decision module 67 is adapted to select the output of the search engines 60', 69, 73 that employs the fewest number of bits to encode a given macroblock.

The search engines 60', 69, 73 are also called sub-engines, since they are within the intra prediction module 54'. The output from the search engine 60', 69, 73 that is selected by the intra mode decision module 67 is forwarded to main mode decision 59 of FIG. 2b.

The intra 4×4 search engine 60' is adapted to process sub-blocks of a macroblock in parallel, such as in a pipelined fashion, as discussed more fully below. The intra 4×4 search engine 60' is further adapted to strategically control the flow of information pertaining to processed sub-blocks of each macroblock, to achieve various efficiencies, such as obviating the need for a large memory, and to facilitate parallel processing, as discussed more fully below.**

Figure 3B:
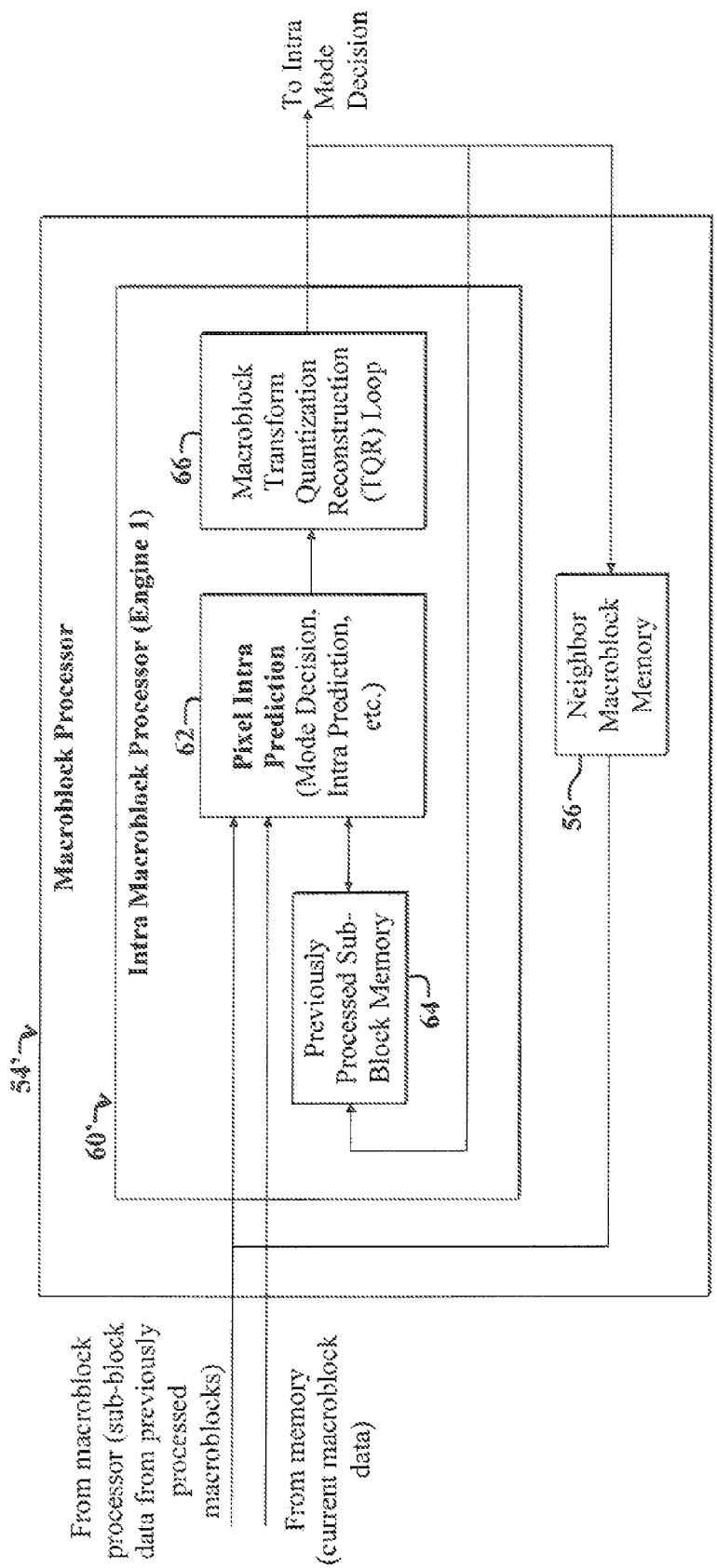
FIG. 3b is a more detailed diagram illustrating example components of the intra macroblock processor included in the encoding modules of FIGS. 2a and 2b and used for parallel processing of video macroblock sub-blocks.

FIG. 3b is a more detailed diagram illustrating example components of the intra macroblock processor 60' of FIG. 3a, which is included in the intra prediction module 54' of the encoding module 20' of FIG. 2b and used for parallel processing of video macroblock sub-blocks. The intra macroblock processor 60' may be employed as the intra macroblock processor 60 of FIG. 2a by moving the TQR loop 66 outside of the macroblock processor 60' of FIG. 3b, as shown in FIG. 2a.

For the purposes of the present discussion, the terms macroblock sub-block, sub-block, and intra block are employed interchangeably. A macroblock sub-block may be any grouping of pixels comprising a portion of a macroblock. An example of a sub-block is a 4×4 block of adjacent pixels in a macroblock.

The example intra prediction module 54' of FIG. 2b includes the intra macroblock processor 60' of FIG. 3a. The intra macroblock processor 60' includes a intra prediction module 62, which communicates with a neighbor sub-block memory 64 that stores previously processed sub-blocks and information associated therewith, such as processing modes used to process each of the sub-blocks. The neighbor sub-block memory 64 is coupled between an output of the TQR loop 66 and an input of the intra prediction module 62. The macroblock processor 54 includes a neighbor macroblock memory 56, which is also coupled between an output of the TQR loop 66 and an input of the intra prediction module 62.

Figure 4:
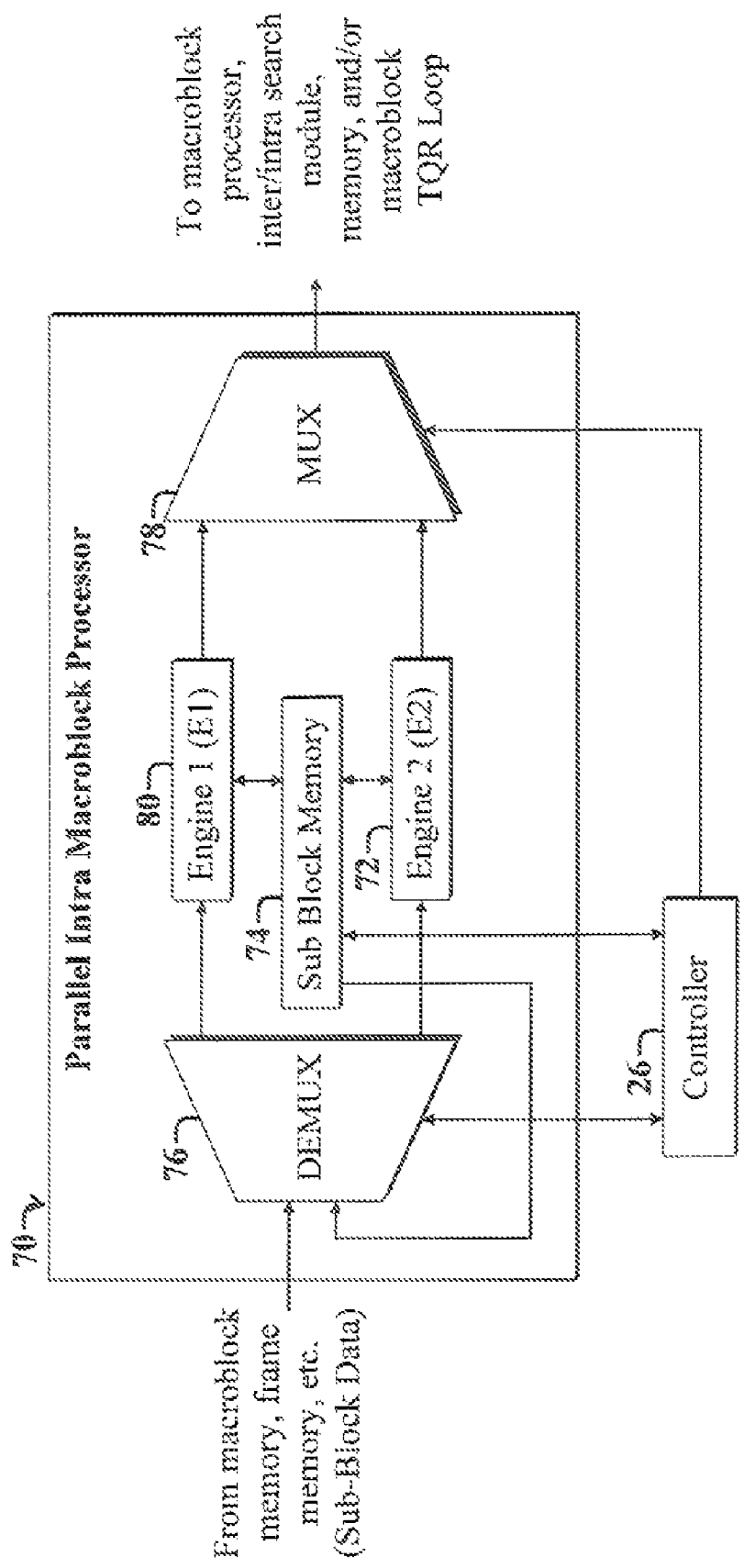
FIG. 4 is a diagram illustrating an alternative intra macroblock processor that employs parallel engines and that is usable with the inter/intra processing module of FIGS. 3a and 3b.

The intra prediction module 62 receives current macroblock information pertaining to a current macroblock to be processed from input-frame memory 30 of FIG. 4. In addition, the intra prediction module 62 receives neighbor macroblock data (e.g., ntop, nleft, etc.) from the TQR loop 66 and receives processed pixel data representing reconstructed pixels pertaining to requisite sub-blocks of the current macroblock, from the neighbor sub-block memory 64.

In operation, intra prediction module 62 runs one or more instructions for implementing pixel prediction and processing-mode decisions. The intra prediction module 62 may include an intra 4×4 neighbor component to determine neighboring pixels for each 4×4 sub-block to be used in the prediction of subsequent sub-blocks, and an intra 4×4 search component to perform prediction calculations and comparisons for each sub-block. The TQR loop 66 facilitates reconstructing pixels within a macroblock and providing reconstructed pixels as feedback to the intra prediction module 62. Data pertaining to the reconstructed pixels, which are also called predicted pixels or intra predicted pixels, are stored in the neighbor sub-block memory 64 for use by the pixel reconstruction module 62 to process subsequent sub-blocks. Pixel reconstruction, as discussed with respect to the present example, includes implementing intra prediction calculations in compliance with H.264 output standards.

Hence, the neighbor sub-block memory 64 stores results of the processing of certain sub-block pixels for use in processing subsequent sub-blocks. Similarly, the neighbor macroblock memory 56 stores results of the processing of certain macroblocks for use in processing subsequent macroblocks and sub-blocks therein. Reconstructed pixels associated with neighboring macroblocks may come from intra (4×4, 8×8, or 16×16) or inter prediction operations. Reconstructed pixels associated with neighboring sub-blocks within a macroblock come from intra prediction operations, such as those performed by the intra prediction module 62. The sub-block memory 64 and the neighbor macroblock memory 56, which are shown as separate memories for illustrative purposes, may be implemented a single memory without departing from the scope of the present teachings.

The loop formed between the intra prediction module 62 and accompanying neighbor sub-block memory 64 may be considered as a nested loop formed within a macroblock-processing loop comprising the macroblock. TQR loop 66, the neighbor macroblock memory 56, and the intra macroblock processor 60'.

The reconstruction module 70 is configured to accept back-to-back sub-blocks for processing in a pipelined fashion. For the purposes of the present discussion, two sub-blocks are said to be processed in a pipelined fashion by a processor, engine, or computer, if at any given time during processing, the processor, engine, or computer works on processing both sub-blocks. The pipelined processing may be staggered so that the processor, engine, or computer completes processing of one sub-block before completing processing of the other sub-block. Two sub-blocks are said to be processed in parallel if at least a portion of each of the two sub-blocks are being processed simultaneously by one or more processors, engines, or computers. Hence, two sub-blocks or macroblocks that are being processed in a pipelined fashion are also being processed in parallel but not necessarily vice versa. Parallel processing may occur via separate processors, engines, or computers that are working or processing simultaneously or via one or more pipelined processors.

FIG. 4 is a diagram illustrating an alternative intra macroblock processor 70 that employs parallel engines 80, 72 and that is usable with the intra macroblock processors 60, 60' of FIGS. 2a, 3a, and 3b. The alternative intra macroblock processor 70 may be inserted in place of the intra macroblock processors 60, 60' in FIGS. 2a and 3b.

The intra microblock processor 70 of FIG. 4 includes a first engine 80 and a second engine 72, which communicate with a shared neighbor sub-block memory 74. An output of the shared sub-block memory 74 is input to a first demultiplexer (DEMUX) 76. Outputs of the engines 80, 72 are coupled to inputs of an output multiplexer (MUX) 78, an output of which is coupled to the macroblock processor 54, the inter/intra processing module 50, and/or the macroblock TQR loop 66 of FIG. 2.

The controller 26 controls the delivery of requisite vectors, motion costs, modes, and reconstructed pixels from the input of the DEMUX 76 to each engine 80, 72 to control the processing of a given sub-block within a macroblock by a given engine 80, 72. For example, the controller 26 includes one or more instructions for determining when the processing of a given macroblock sub-block is complete; when certain requisite previous sub-blocks have been processed to enable processing of a subsequent sub-block; and for delivering requisite reconstructed pixel information to the appropriate engine 80, 72. While in the present embodiment, the controller 26 is shown implemented separately from the engines 80, 72, similar sequencing functionality may be incorporated within the engines 80, 72 or elsewhere without departing from the scope of the present teachings. Furthermore, the controller 26 shown in FIG. 4 may be implemented via the same controller 26 as shown in FIGS. 1-2 or via a different controller.

While in tire present example embodiment, sub-blocks of macroblocks are processed in parallel, macro blocks may also be processed in parallel in accordance with the teachings of U.S. patent application Ser. No. 11/693,506, entitled PARALLEL OR PIPELINED MACROBLOCK PROCESSING, which is assigned to the assignee of the present invention and which is hereby incorporated by reference herein. Those skilled in the art with access to the present teachings may readily implement a video encoder employing parallel processing of macroblocks and macroblock sub-blocks in accordance with the present teachings, without undue experimentation.

Figure 5:
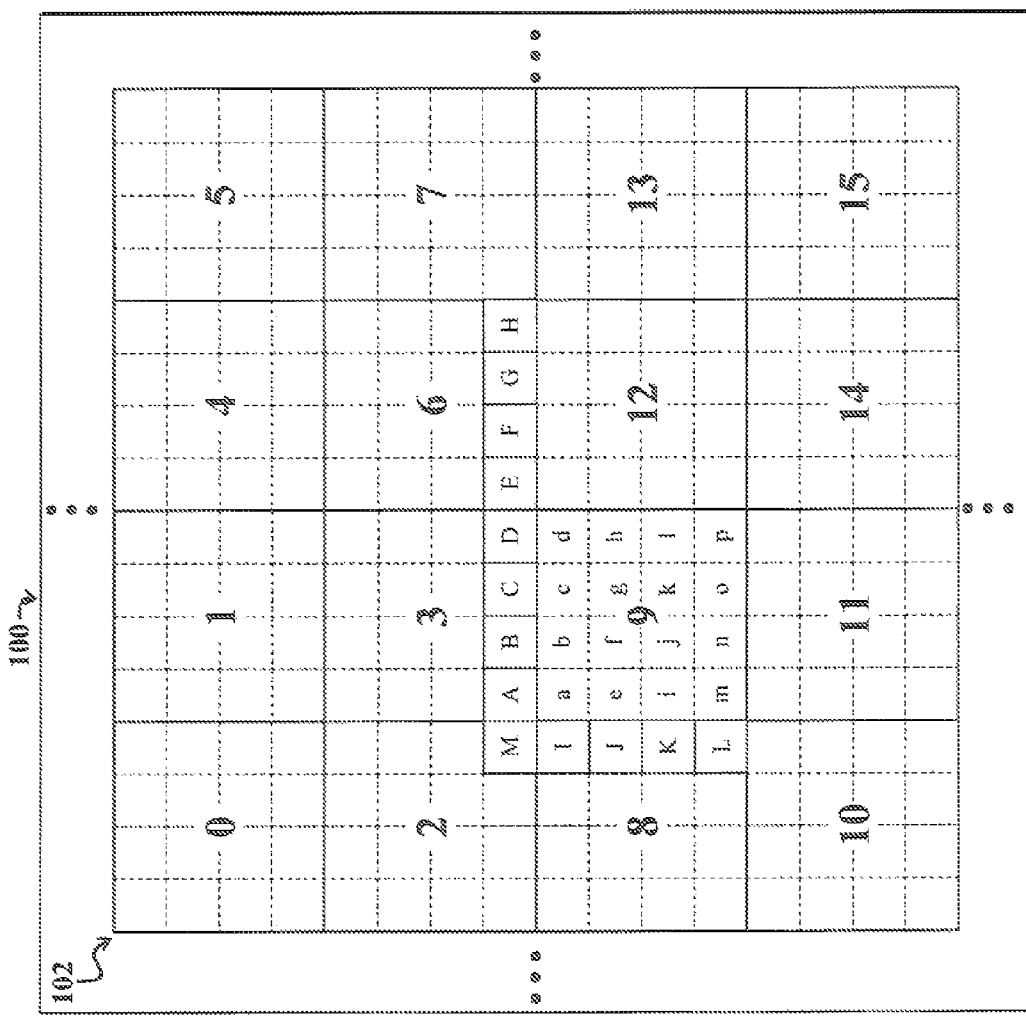
FIG. 5 is a diagram of art example frame illustrating a macroblock, constituent sub-blocks, and neighboring pixels of adjacent sub-blocks used to process an example sub-block.

FIG. 5 is a diagram of an example frame 100 illustrating a macroblock 102 wife sixteen constituent Sub-Blocks (SBs 0→15) numbered 0-15 in accordance with H.264 standards. FIG. 5 further illustrates neighboring pixels (pixels A→M) of adjacent sub-blocks (SBs 8, 2, 3, 6) used to process an example sub-block (SB9). The macroblock 102 represents a 16×16 square of pixels, which are partitioned into sixteen squares of sub-blocks, where each sub-block includes a 4×4 square of sixteen pixels (labeled a→p).

With reference to FIGS. 3-5, in the present example, pixels A→M of SBs 2, 3, 6, 8 are employed by the intra macroblock processors 60, 60', 70 to predict pixels a→p of SB 9. For the purposes of the present discussion, SB9 is said to be processed when the constituent pixels a→p are predicted. Predicted pixels are also said to be reconstructed.

Similarly, other sub-blocks of the macroblock 102 use previously predicted, i.e., processed pixels of sub-blocks to the left, upper left, above, and to the upper right of the sub-blocks. For example, the processing of SB3 requires previously processed pixels from SBs 0, 2, 1, and 4. As another example, the processing of SB0 uses previously processed pixels from neighboring macroblocks. In particular, SB0 would use pixels from the tenth and eleventh sub-block of a macroblock (not shown) above the macroblock 102; would use pixels from the fifteenth sub-block of the macroblock to the upper left of the macroblock 102; would use pixels from fifth sub-block of the macroblock to the left of the macroblock 102. Pixel information from neighboring macroblocks is retrieved or delivered to the intra macroblock processors 60, 60', 70 from the neighbor macroblock memory 56 of FIG. 3b.

Note that the successful processing of SB9 according to certain H.264 standards depends upon the results of the processing of SBs 2, 3, 6, 8. Conventionally, sub-blocks are processed serially due to such dependencies on previously processed sub-blocks. However, in certain example embodiments discussed herein, sub-blocks are selectively processed in parallel, such as via the pipelined processor 60' of FIGS. 3a and 3b or the parallel engines 80, 72 of FIG. 4, by taking advantage of the ordering of sub-blocks within a macroblock, such as the macroblock 102, as discussed more fully below.

Processing dependencies for the processing of a given sub-block for the macroblock 102 are summarized in Table 1 below.

TABLE 1

| Sub-block (SB) | Previously processed Sub-blocks (SBs) in the current macroblock used to process the indicated sub-block |
|---|---|
| 0 | |
| 1 | 0 |
| 2 | 0, 1 |
| 3 | 0, 1, 2, 4 |

TABLE 1-continued

| Sub-block (SB) | Previously processed Sub-blocks (SBs) in the current macroblock used to process the indicated sub-block |
|---|---|
| 4 | 1 |
| 5 | 4 |
| 6 | 1, 3, 4, 5 |
| 7 | 4, 5, 6 |
| 8 | 2, 3 |
| 9 | 2, 3, 6, 8 |
| 10 | 8, 9 |
| 11 | 8, 9, 10, 12 |
| 12 | 3, 6, 7, 9 |
| 13 | 6, 7, 12 |
| 14 | 9, 11, 12, 13 |
| 15 | 12, 13, 14 |

Figure 6:
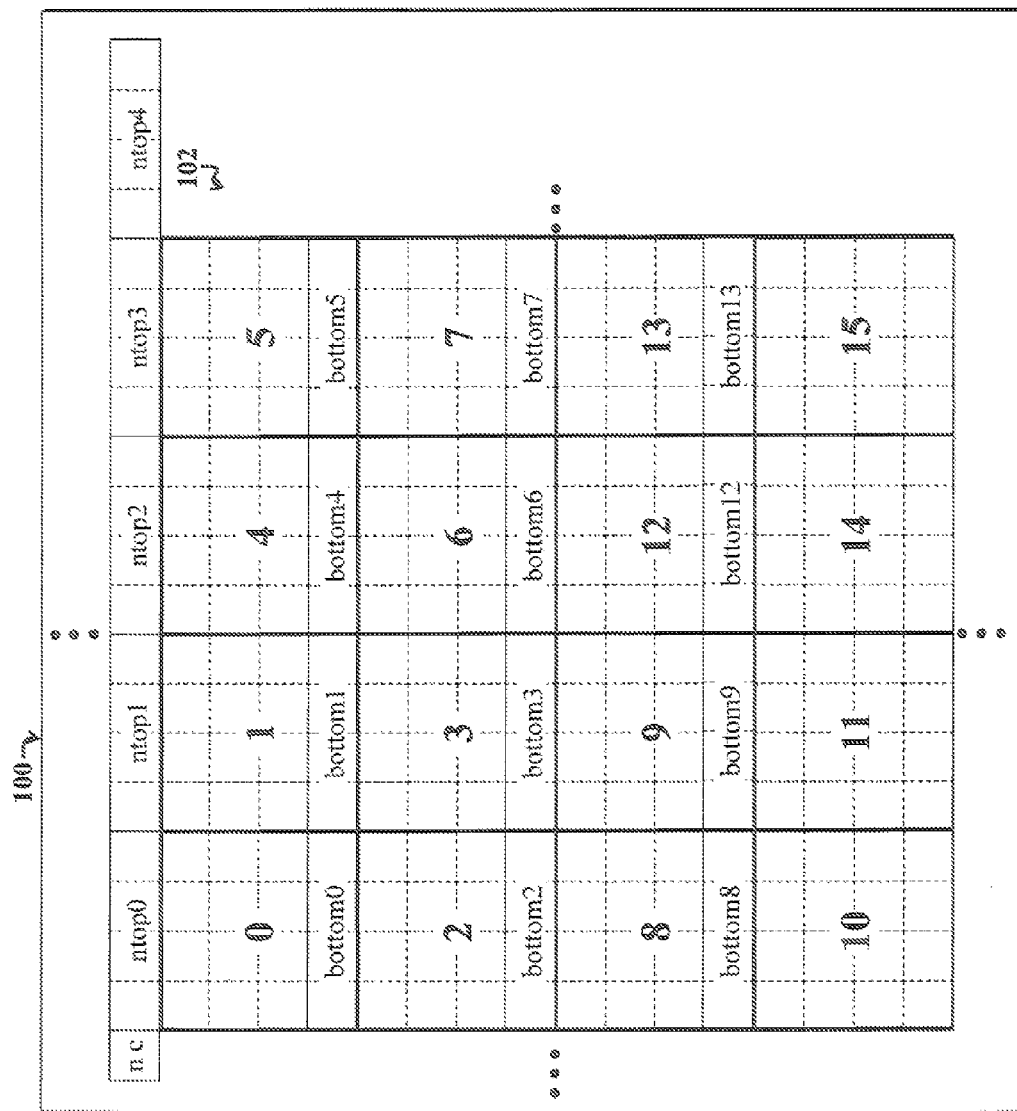
FIG. 6 is a diagram illustrating example labeling of certain rows of pixels of sub-blocks of the macroblock of FIG. 5 that are employed by the intra macroblock processors of FIGS. 3b and 4 to process other sub-blocks of the macroblock.

FIG. 6 is a diagram illustrating example labeling of certain rows of pixels of sub-blocks (SBs 0→15) of the macroblock 102 of the frame 100 of FIG. 5 that are employed by the intra macroblock processors 60, 60', 70 of FIGS. 2-4 to process other sub-blocks of the macroblock 102. Pixels in a row of pixels directly above SB0, which are positioned in the macroblock above the macroblock 100, are labeled ntop0 pixels. Pixels in a row of pixels directly above SB1 are labeled ntop1. Pixels in a row of pixels directly above SB4 are labeled ntop2. Similarly, pixels in a row of pixels directly above SB5 are labeled ntop3. In addition, pixels in a bottom row of a sub-block of a macroblock diagonally to the upper right of the macroblock 100 are labeled ntop4 pixels. As an example, with reference to FIG. 5, the ntop0 pixels and the ntop1 pixels correspond to A→D and E→H pixels for SB0, respectively.

Rows of pixels within the macroblock 102 that are used for the processing of other sub-blocks are labeled bottom0→bottom15, as they are positioned in the bottom portions of SBs 0→15, respectively. As an example, with reference to FIGS. 5 and 6, bottom3 and bottom6 pixels represent pixels A→H used by SB9.

Figure 7:
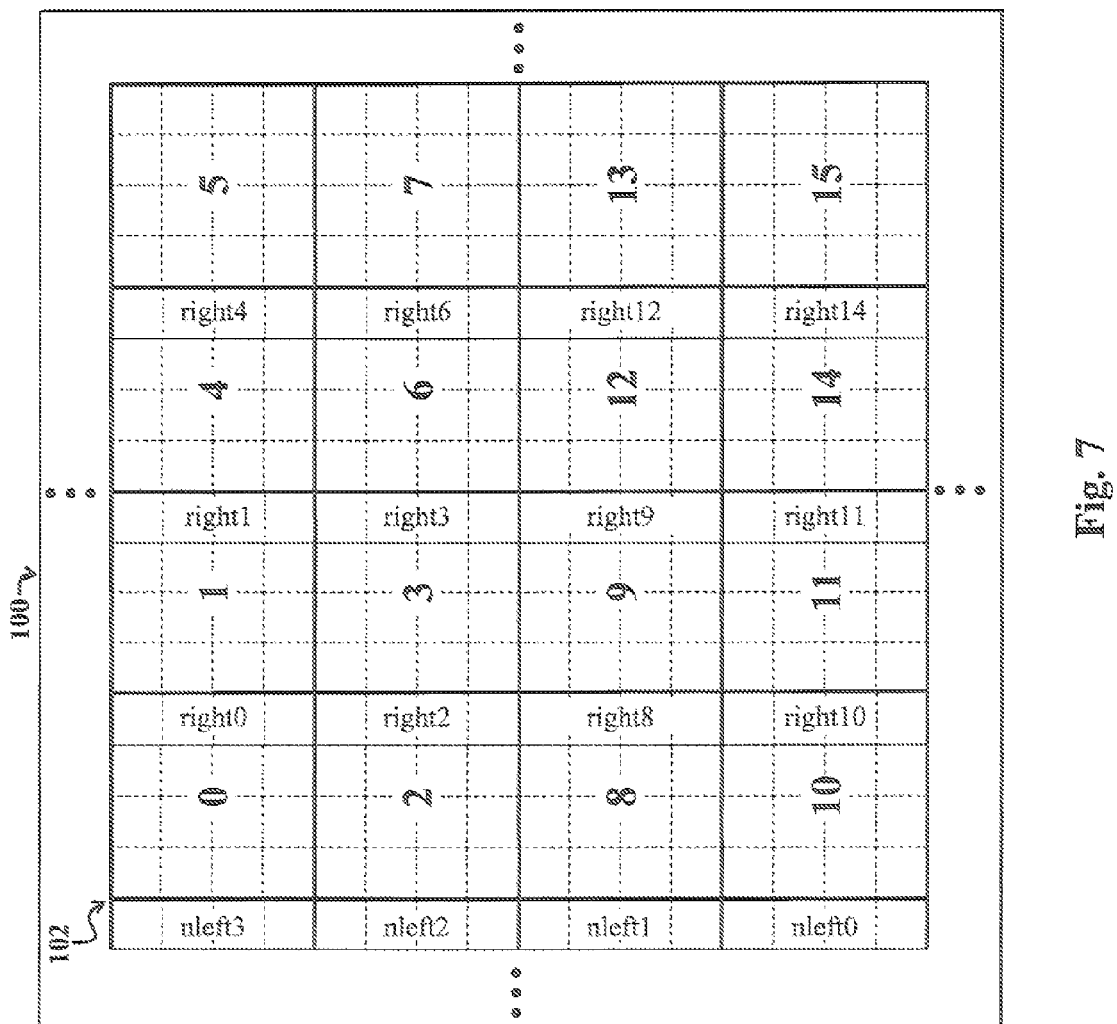
FIG. 7 is a diagram illustrating example labeling of certain columns of pixels of sub-blocks of the macroblock of FIGS. 5 and 6 that are employed by the intra macroblock processors of FIGS. 3b and 4 to process other sub-blocks of the macroblock.

FIG. 7 is a diagram illustrating example labeling of certain columns of pixels of SBs 0→15 of the macroblock 102 of FIGS. 5 and 6 that are employed by the intra macroblock processors 60, 60', 70 of FIGS. 2-4 to process other sub-blocks of the macroblock 102. Pixels in a column of pixels directly to the left of SB10, which are positioned in a macroblock directly to the left the macroblock 102, are labeled nleft0 pixels. Pixels in a column of pixels directly to the left of SB8 are labeled nleft1. Pixels directly to the left of SB2 are labeled nleft2. Similarly, pixels in a column of pixels directly to the left of SB0 are labeled nleft3.

Columns of pixels within the macroblock 102 that are used for the processing of other sub-blocks are labeled right0→right15, as they are positioned in SBs 0→15, respectively. As an example, with reference to FIGS. 3-7, right8 pixels and the bottom pixel of the right2 pixels are used by the intra macroblock processors 60, 60', 70 of FIGS. 2-4, in addition to the bottom3 and bottom6 pixels of FIG. 6, to process SB9. The right8 pixels correspond to pixels I→L of FIG. 5. The bottom pixel of the right2 pixels corresponds to pixel M of FIG. 5.

Processing dependencies for the processing of a given sub-block for the macroblock 102 in accordance with the present labeling are summarized in Table 2 below.

TABLE 2

| Sub-Block | Pixels A, B, C, D | Pixels E, F, G, H | Pixels I, J, K, L | Pixel M |
|---|---|---|---|---|
| 0 | ntop0 | ntop1 | nleft3 | nc |
| 1 | ntop1 | ntop2 | right0 | ntop0 |
| 2 | bottom0 | bottom1 | nleft2 | nleft3 |
| 3 | bottom1 | bottom4 | right2 | bottom0 |
| 4 | ntop2 | ntop3 | right1 | ntop1 |
| 5 | ntop3 | ntop4 | right4 | ntop2 |
| 6 | bottom4 | bottom5 | right3 | bottom1 |
| 7 | bottom5 | right pixel of bottom5 x4 | right6 | bottom4 |
| 8 | bottom2 | bottom3 | nleft1 | nleft2 |
| 9 | bottom3 | bottom6 | right8 | bottom2 |
| 10 | bottom8 | bottom9 | nleft0 | nleft1 |
| 11 | bottom9 | bottom12 | right10 | bottom8 |
| 12 | bottom6 | bottom7 | right9 | bottom3 |
| 13 | bottom7 | right pixel of bottom7 x4 | right12 | bottom6 |
| 14 | bottom12 | bottom13 | right11 | bottom9 |
| 15 | bottom13 | right pixel of bottom13 x4 | right14 | bottom12 |

Figure 8:
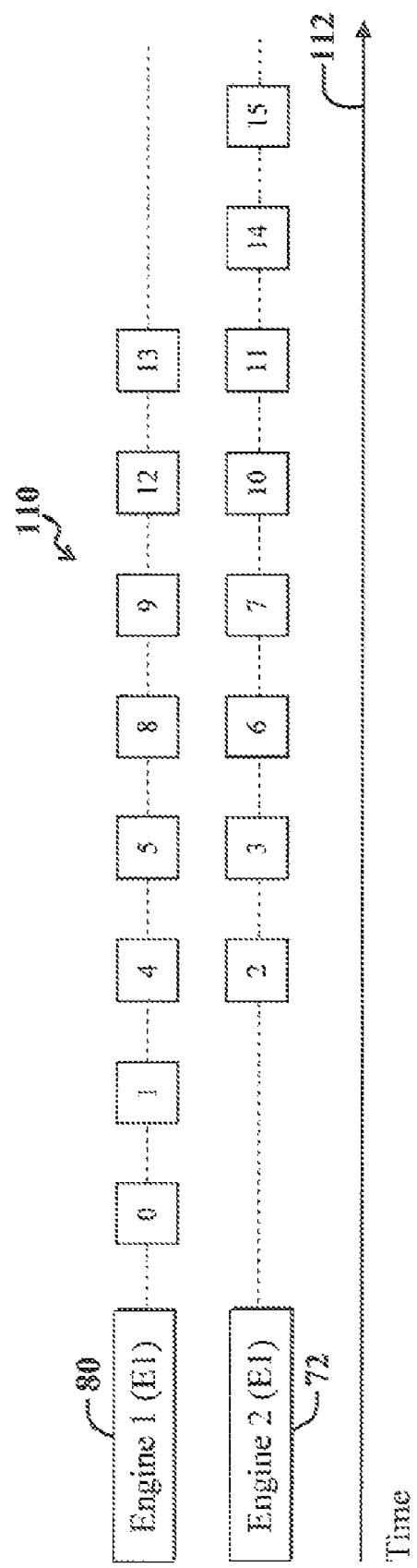
FIG. 8 is a first example timing diagram illustrating a first example of when certain sub-blocks of the example macroblock of FIGS. 5-7 are processed by the intra macroblock processors of FIGS. 2-4.

FIG. 8 is a first example timing diagram 110 illustrating a first example of when certain sub-blocks (SBs 0→15) of the example macroblock 102 of FIGS. 5-7 are processed by the intra macroblock processors 60, 60', 70 of FIGS. 2-4. Illustrative processing intervals for the SBs 0→15 are plotted along a horizontal time axis 112. Note that in practice, the processing intervals shown in FIG. 8 may be staggered and processed via a pipelined engine instead of the two engines 80, 72 shown in FIG. 8.

With reference to FIGS. 3-7 and Tables 1 and 2 above, in one operative scenario, the first engine 90 processes SBs 0, 1, 4, 5, 8, 9, 12, and 13 in sequence. The second engine 72 begins processing SBs 2, 3, 6, 7, 10, 11, 14, and 15 in sequence after the first engine 80 completes processing SB0 so that when the first engine 80 is processing SB4, the second engine 72 is processing SB2. The processing is staggered so that the following pairs of sub-blocks are processed in parallel: SB4 and SB2, SB5 and SB3, SB8 and SB6, SB9 and SB7, SB12 and SB10, SB13 and SB11. Note that if sub-blocks are processed in the sequences given in FIG. 8, by the time any given sub-block is processed, the pixels of the other sub-blocks used to process the given sub-block have already been processed. Hence, by capitalizing on the sub-block processing dependencies and the ordering of sub-blocks within a macroblock, efficient parallel processing of sub-blocks is achieved.

In a second operative scenario, the pipelined processor 60' of FIGS. 3a and 3b, also called a pipelined engine, processes SBs 0 and 1 before SB4 is processed. SB2 is fed into the pipelined processor 60' directly behind SB4 so that the pipelined processor 60' begins processing SB2 before the processing of SB4 is complete. Alternatively, the pipelined processor 60' begins processing SB2 just before it begins processing SB4. Either way, the processing of SB2 and 4 by the pipelined processor 60' overlap so that parallel processing is achieved. Similarly, the other pairs of sub-blocks (SB5 and SB3, SB8 and SB6, SB9 and SB7, SB12 and SB10, SB13 and SB11) are processed by the pipelined processor 60' in a pipelined fashion.

Figure 9:
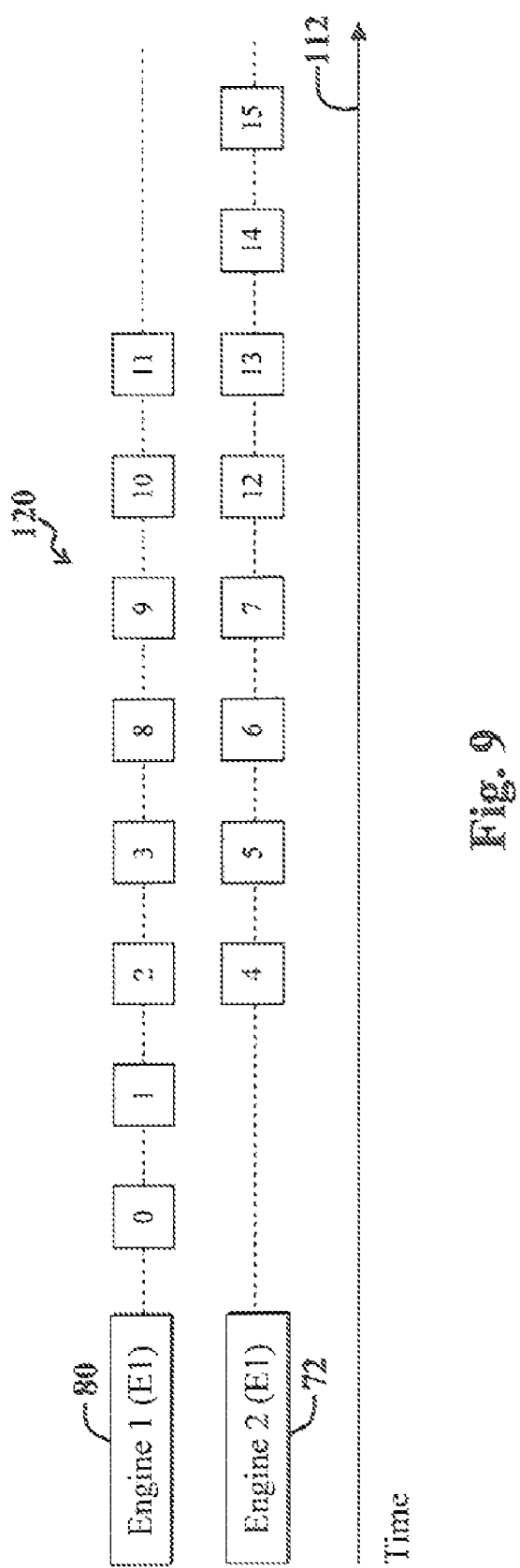
FIG. 9 is a second timing diagram illustrating a second example of when certain sub-blocks of an example macroblock of FIGS. 5-7 are processed by the intra macroblock processors of FIGS. 2-4.

FIG. 9 is a second timing diagram 120 illustrating a second example of when certain sub-blocks (SBs 0→15) of the macroblock 102 of FIGS. 5-7 are processed by the intra macroblock processors 60, 60', 70 of FIGS. 2-4. Processing intervals for the SBs 0→15 are plotted along the horizontal time axis 112. The timing diagram 120 of FIG. 9 is similar to the timing diagram of FIG. 8 with the exception that the first engine 80 of the parallel intra macroblock processor 70 of FIG. 4 processes sub-blocks in the following sequence: SB0, SB1, SB2, SB3, SB5, SB9, SB10, SB11. In addition, the second engine 72 of the parallel intra macroblock processor 70 of FIG. 4 processes sub-blocks in the following sequence: SB4, SB5, SB6, SB7, SB12, SB13, SB14, SB15 after the first engine has processed SBs 0 and 1. Accordingly, the following pairs of sub-blocks are processed in parallel by the parallel processor 70 or the pipelined processor 60' of FIGS. 3a and 3b: SB2 and SB4, SB3 and SB5, SB6 and SB5, SB7 and SB9, SB10 and SB12, SB11 and SB13.

FIG. 10 is a flow diagram of an example method 150 suitable for use with, the intra macroblock processors 60, 60', 70 of FIGS. 3-4 and accompanying inter/intra processing module 50 of FIG. 1-2.

In a first step 152, the method 150 includes receiving information, such as neighboring pixel information, to process a first sub-block. A second step 154 includes receiving information to process a second sub-block.

A third, step 154 determines whether sufficient information associated with one or more previously processed sub-blocks is simultaneously available for processing the first sub-block and the second sub-block. If sufficient information is not available, steps 150 and 152 are performed as needed. When sufficient information is available a fourth step 158 is performed.

The fourth step 158 includes processing a first portion of the second sub-block simultaneously with a second portion of tire first sub-block. Subsequently, the method 150 completes.

In certain implementations, the first portion of the second sub-block may include the entire second sub-block, and the second portion of the first sub-block may include the entire first sub-block, so that the entire first sub-block and the entire second sub-block are processed in parallel. Such implementations may involve use of the parallel engines 80, 72 of FIG. 4. Alternatively, pairs of macroblocks are processed slightly staggered, so that the processing of the first sub-block may complete before the processing of the second sub-block. Such implementations may involve use of the pipelined engine 60' of FIGS. 3a and 3b or the parallel engines 80, 72 of FIG. 4.

Although embodiments of the invention are discussed primarily with respect to an H.264-compliant encoder, embodiments of the present invention may be adapted to any video encoder wherein parallel engines or a pipelined engine may be useful to process macroblocks and/or sub-blocks of the macroblocks in a frame. Furthermore, any acceptable architecture, topology, protocols, or other network and digital processing features can be employed. In general, certain modules and components discussed herein can be implemented in hardware, software, or via any device with processing ability or other requisite functionality. Techniques described herein may be suitable for use with other types of information processing. For example, the processing can operate on previously compressed or encoded image information, on three-dimensional image data, on non-visual information, etc.

Although specific processing sequences have been provided for processing data such as macroblocks, sub-blocks, slices, etc., any other suitable processing order or approach may be used. For example, any number of contiguous macroblocks may be in a slice. A slice can be a horizontal band but can also span horizontal bands, or be oriented vertically, diagonally, or in other non-horizontal directions.

Although specific processing sequences have been provided for processing data such as macroblocks, sub-blocks, slices, etc., any other suitable processing order or approach may be used. For example, any number of contiguous macroblocks may be in a slice. A slice can be a horizontal band but can also span horizontal bands, or be oriented vertically, diagonally, or in other non-horizontal directions.

Arrowheads shown, on signal paths between various modules are for illustrative purposes only. For example, various communication paths or connecting lines, which appear to be unidirectional in the drawings, may be bidirectional without departing from the scope of the present teachings.

Although, processes of the present, invention and the hardware executing, the processes may be characterized by language common to a discussion of video processing (e.g., "FPGA," "CABAC," etc.), it should be apparent that operations of an embodiment of the present invention can execute on any type of suitable hardware in any communication relationship to another device on any type of link or network.

Although a process of the present invention may be presented as a single entity, such as software or hardware executing on a single machine, such software can readily be executed on multiple machines. That is, there may be multiple-instances of a given software program, a single program may be executing on two or more processors in a distributed processing environment, parts of a single program may be executing on different physical machines, etc. Furthermore, two different programs, such as a transformation program and a quantization program, can be executing in a single module, or in different modules.

Although the invention has been discussed with respect to specific example embodiments thereof these embodiments are merely illustrative, and not restrictive, of the invention. In the description herein, numerous specific details are provided, such as examples of components and/or methods, to provide a thorough understanding of discussed example embodiments. One skilled, in the relevant art will recognize, however, that certain embodiments can be practiced without one or more of the specific details, or with other apparatus, systems, assemblies, methods, components, materials, parts, and/or the like, in other instances, well-known structures, materials, or operations are not specifically shown or described in detail to avoid obscuring aspects of the example embodiments discussed herein.

A "machine-readable medium" or "computer-readable medium" may be any medium that can contain, store, communicate, propagate, or transport the program for use by or in connection with, the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment not necessarily included in all possible example embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment or example embodiment discussed herein may be combined in any suitable manner with one or more other embodiments. It is to be understood that other variations and modifications of the embodiments described and illustrated herein are possible in light of the teachings herein, and the variations are to be considered as part of the spirit and scope of the present teachings.

Example embodiments discussed herein may be implemented in whole or in part, by using a programmed general purpose digital computer; by using application specific integrated circuits, programmable logic devices, FPGAs, optical, chemical, biological, quantum or nanoengineered systems or mechanisms; and so on. In general, the functions of various embodiments can be achieved by any means as is known in the art. Distributed or networked systems, components, and/or circuits can be used. Communication, or transfer of data may be wired, wireless, or by any other means.

It will also be appreciated that, one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated example embodiments, including what is described in the Abstract, is not intended to be exhaustive or to limit the invention to the precise forms disclosed herein. While certain example embodiments are described herein for illustrative purposes only, various equivalent modifications are possible within the spirit and scope of the present invention, as those skilled in the relevant art will recognize and appreciate. As indicated, these modifications may be made in light of the foregoing description of illustrated example embodiments and are to be included within the spirit and scope of the present invention.

Thus, while example embodiments have been described herein, a latitude of modification, various changes and substitutions are intended in the foregoing disclosures, and it will be appreciated that in some instances some features of embodiments will be employed without a corresponding use of other features without departing from the scope and spirit of the invention. Therefore, many modifications may be made to adapt a particular situation or material to the essential scope and spirit of the present invention. It is intended that the invention not be limited to the particular terms used in following claims and/or to a particular embodiment disclosed as the best mode contemplated for carrying out this invention, but that the invention will include any and all embodiments and equivalents falling within the scope of the appended claims.

What is claimed is:

1. A system for processing sub-blocks of a macroblock, the system comprising:
   a memory;
   a processor operative to:
      process each sub-block of the macroblock, wherein each sub-block is associated with a predetermined position in a first sequence, wherein the processing of certain sub-blocks in the first sequence requires results of processing of one or more previously processed sub-blocks in the first sequence, wherein the processing of one or more previously processed sub-blocks in the first sequence comprises the processor operative to form a prediction sub-block based on information pertaining to a current macroblock to be processed; and
      selectively process each sub-block of the macroblock in a second sequence, wherein the second sequence is altered from the first sequence to enable the first module to process certain sub-blocks of the macroblock in parallel; and
   a controller for controlling a demultiplexer to dispatch the sub-blocks of the macroblock and requisite processing information pertaining to the sub-blocks of the macroblock to the first sequence and the second sequence, wherein the sub-blocks are dispatched on successive clock ticks.

2. The system of claim 1, wherein the processor is further operative to implement an intra prediction of pixels within each sub-block.

3. The system of claim 1, further comprising first means for processing sub-blocks of certain pairs of sub-blocks in parallel.

4. The system of claim 1, first means for processing sub-blocks of certain pairs of sub-blocks in a pipeline fashion.

5. The system of claim 3, wherein the first means includes: a first engine and a second engine.

6. The system of claim 1, wherein the demultiplexer is adapted to feed the requisite information pertaining to one or more sub-blocks to the processor in a desired sequence or in parallel in response to a predetermined control signal to enable processing of the one or more sub-blocks.

7. A method for processing a sub-block of a macroblock, the method comprising: receiving, at a processor, information to process a first sub-block, where the receiving information to process a first sub-block comprises receiving at least one previously processed sub-blocks in the first sub-block operative to form a prediction sub-block based on information pertaining to a current macroblock to be processed; receiving, at the processor, information to process a second sub-block; processing a first portion of the second sub-block simultaneously with a second portion of the first sub-block when information associated with one or more previously processed sub-blocks is simultaneously available for processing the first sub-block and the second sub-block; and
   dispatching, by a multiplexer circuit, the first sub-block, the second sub-block and requisite processing information pertaining to the sub-blocks of the macroblock to the first sequence and the second sequence, wherein the sub-blocks are dispatched on successive clock ticks.

8. An apparatus for facilitating processing a macroblock, the apparatus comprising:
   a processor operative to selectively stagger the delivery of information pertaining to a first sequence of sub-blocks and a second sequence of sub-blocks to the processor so that one or more sub-blocks of the first sequence or the second sequence that are required for processing certain sub-blocks of the first sequence and second sequence in parallel, are available to the processor before the processor processes the certain sub-blocks, where the information pertaining to the first sequence of sub-blocks comprises at least one previously processed sub-block in the first sequence of sub-blocks operative to form a prediction sub-block based on information pertaining to a current macroblock to be processed; and
   a controller circuit for controlling a demultiplexer to dispatch sub-blocks of the macroblock and the information pertaining to the sub-blocks of the macroblock to the first sequence and the second sequence, wherein the sub-blocks are dispatched on successive clock ticks.

9. The apparatus of claim 8, wherein the certain sub-blocks include a certain pair of sub-blocks.

10. The apparatus of claim 8, further comprising an output operative to selectively deliver, from the processor, certain processed pairs of sub-blocks, wherein the processed pairs were processed in parallel by the processor.

11. A system for processing a macroblock, the system comprising:
    a memory;
    a processor operative to:
       process a sub-block; and
       selectively enable the processor to begin processing a first sub-block and enable the processor to begin processing a second sub-block without waiting for the processor to complete processing of the first sub-block, when information is available to process the second sub-block, wherein the information available to process the second sub-block comprises a prediction sub-block based on the second sub-block; and
    a controller for controlling a demultiplexer to dispatch sub-blocks of the macroblock and requisite processing information pertaining to the sub-blocks of the macroblock to the first sequence and the second sequence, wherein the sub-blocks are dispatched on successive clock ticks.

12. The system of claim 1, wherein the prediction sub-block is formed based on neighbor sub-block information and processed pixel data representing reconstructed pixels pertaining to requisite sub-blocks of the current macroblock.

13. The system of claim 1, wherein the neighbor sub-block information include information regarding top, top right and left sub-blocks in the macroblock.

14. The system of claim 13, wherein the processor is further operative to:
    transform the residual macroblock from time domain to frequency domain to form a transformed macroblock;
    quantize and then dequantize the transformed macroblock; and
    transform the dequantized transformed macroblock from the frequency domain to time domain to form a resulting residual macroblock.

15. The system of claim 14, wherein the processor is further operative to add the resulting residual macroblock to the predicted sub-block to form a reconstructed macroblock.

16. The system of claim 14, wherein the processor is further operative to track a bit production rate wherein bit production is a number of bits processed during quantization of the transformed macroblock.

17. The system of claim 14, wherein the sub-blocks and the requisite processing information pertaining to the sub-blocks are dispatched to the first sequence and the second sequence based on at least one of the following: a picture complexity, current bit buffer levels and the bit production rate from the previous sub-blocks.

18. The system of claim 14, wherein the processor is further operative to determine a sum absolute difference (SAD) value, wherein the SAD value represent a measure of quality, efficiency and accuracy of the prediction sub-block.

19. The system of claim 18, wherein the accuracy of the prediction sub-block is a measure of how closely the predicted sub-block matches with corresponding original sub-block in unprocessed macroblock.

20. The system of claim 1, wherein the processor is further operative to subtract the predicted sub-block from the corresponding macroblock to form a residual macroblock.

* * * * *